United States Patent [19]

Murata et al.

[11] Patent Number: 4,812,857
[45] Date of Patent: Mar. 14, 1989

[54] OPTICAL INFORMATION RECORD DISK

[75] Inventors: Yasushi Murata; Shuich Yanagisawa, both of Tokorozawa, Japan

[73] Assignee: Pioneer Electronic Corporation, Tokyo, Japan

[21] Appl. No.: 111,681

[22] Filed: Oct. 23, 1987

[30] Foreign Application Priority Data

Oct. 30, 1986 [JP] Japan .......................... 61-166967[U]

[51] Int. Cl.$^4$ .................... G01D 15/34; G11B 3/70
[52] U.S. Cl. ................................. 346/137; 369/284
[58] Field of Search ................. 346/137, 135.1, 76 L; 369/283, 284, 285, 286, 287, 288

[56] References Cited

U.S. PATENT DOCUMENTS 4,365,258 12/1982 Geyer ................................. 346/137

Primary Examiner—E. A. Goldberg
Assistant Examiner—Mark Reinhart
Attorney, Agent, or Firm—Foley & Lardner, Schwartz, Jeffery, Schwaab, Mack, Blumenthal & Evans

[57] ABSTRACT

The structure of an annular spacer adapted to be sandwiched between a pair of circular base plates in an optical information record disk of the air sandwiching type.

The annular spacer has an annular groove having a flattened bottom which groove is formed on each of opposite faces of the annular spacer on which circular base plates are carried in order to allow layers of a bonding agent between the circular base plates and the spacer to have a sufficient thickness required for adhesion between them.

4 Claims, 1 Drawing Sheet

OPTICAL INFORMATION RECORD DISK

BACKGROUND OF THE INVENTION

1. Field of the Invention

This invention relates to an optical information record disk, and more particularly to an optical information record disk of the type wherein a spacing is formed adjacent an internal signal record layer.

2. Description of the Prior Art

In an optical information record disk such as, for example, a DRAW (Direct Read After Write) disk, protection of a layer in which pits are formed, that is, a signal record layer is important because information is recorded as a large number of fine pits in the layer of the disk by a laser beam spot. Thus, an optical disk of the so-called "air sandwiching type" has been developed which includes a pair of circular base plates, at least one of which has a signal record layer formed thereon, and which are joined together in an opposing relationship such that the signal record layer may be located inside the disk.

In such a DRAW disk, a pair of circular base plates made of PC or PMMA are joined together in an opposing relationship with an internal spacing left therebetween, and a pair of signal record layers are located on inner faces of the transparent base plates. The base plates are adhered to each other by a layer of a bonding agent with a spacing left between the base plates by means of a pair of annular spacers at inner and outer circumferences of the disk. In such a DRAW disk, the area over which the annular spacers and each of the base plates are adhered to each other is small and is restricted to a portion of the disk over the signal record layer. Such a small area of adhesion between each of the base plates and the annular spacers results in a problem that the adhered portions of the disk may readily be exfoliated when the disk is acted upon by an impact force.

Thus, a bonding agent having a suitable visco-elasticity is used for the adhesive layer so as to act as a buffer for preventing such exfoliation of the disk caused by an impact force.

However, where there is a molding strain on surfaces of a pair of annular spacers at which the annular spacers are to contact with a base plate, adhesive layers may be extremely reduced in thickness at some portions thereof. Thus, it is a disadvantage that a desired buffer effect cannot be attained at such very thin portions of the adhesive layers of the disk and accordingly the disk may suffer from exfoliation at the very thin portions of the adhesive layer.

OBJECTS AND SUMMARY OF THE INVENTION

It is an object of the present invention to provide a firm optical information record disk which can be produced easily and wherein adhered portions thereof between base plates and annular spacers will not readily be exfoliated, eliminating the problems described above.

It is another object of the present invention to provide an optical information record disk wherein a liquid bonding agent is prevented from flowing out from between base plates and annular spacers while the base plates and the annular spacers are being adhered.

According to the present invention, an optical information record disk which includes a pair of circular base plates at least one of which has a signal record layer thereon, a pair of annular spacers for carrying thereon outer and inner circumferential portions of the circular base plates in an opposing parallel relationship such that the signal record layer or layers may be located inside the record disk, and layers of a bonding agent for securing the circular base plates and the annular spacers to each other, is characterized in that at least one of the annular spacers had an annular groove formed on each of carrying faces thereof on which the circular base plates are carried.

The optical information record disk according the present invention is further characterized in that each of the annular grooves on the carrying faces of the annular spacer on which the circular base plates are carried has a flattened bottom portion and an annular summit portion extending in a radial direction of the circular disks and defined by a pair of inclined faces which extend radially inwardly from the carrying faces at obtuse angles relative to the carrying faces.

According to the present invention, an optical information record disk wherein an annular groove having a flattened bottom is formed on each of carrying faces of at least one of a pair of annular spacers on which a pair of circular base plates are carried, and the annular spacer on which the annular groove is formed has an annular summit portion extending in a radial direction of the circular disks and defined by a pair of inclined faces which extend radially inwardly form the carrying faces at obtuse angles relative to the carrying faces, is characterized in that the annular groove has a pair of inner and outer circumferential deep portions.

DETAILED DESCRIPTION OF THE PREFERRED EMBODIMENTS

Now, DRAW disks of preferred embodiments of the present invention will be described with reference to schematic partial cross sectional views of FIGS. 1 to 4.

Figure 4:
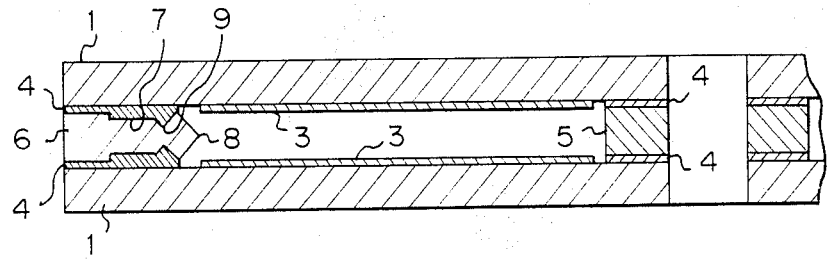
FIG. 4 is a schematic cross sectional view of a DRAW disk of another embodiment of the present invention.

Referring first to FIG. 4, there is shown a schematic partial cross section of a DRAW disk which has been developed already.

As shown in FIG. 4, a DRAW disk shown includes a pair of transparent circular base plates 1 made of PMMA and arranged in an opposing relationship to each other with an internal spacing 2 left therebetween, and a signal record layer 3 formed on each of inner faces of the base plates 1. The base plates 1 are secured to each other by adhesive layers 4 with a pair of inner and outer circumferential annular spacers 5, 6 interposed therebetween. The annular spacer 6 has a pair of annular grooves 7 formed on carrying faces thereof on which the base plates 1 are carried. The annular spacer 6 further has an annular summit portion 8 formed radially inwardly of the annular grooves 7 and defined by a pair of inclined faces which extend radially inwardly from the carrying faces at obtuse angles relative to the carrying faces. Further, each of the annular grooves 7 is formed from a flattened shallow bottom portion and a deep portion 9 of a wedge-shaped cross section contiguous to the annular summit portion 8.

As apparently seen from FIG. 4, in the DRAW disk shown, the flattened shallow bottom portions are provided in order to improve the force of a bonding agent to adhere the base plates 1 and the outer circumferential annular spacer 6 to each other, and the deep portions 9 of a wedge-shaped cross section are provided in order to catch excessive bonding agent when the base plates 1 and the inner and outer circumferential annular spacers 5, 6 are adhered to each other in the course of production of the DRAW disk.

In producing such a DRAW disk as described above, because the outer circumferential annular spacer has shoulders or offsets adjacent an outer periphery thereof and the deep portions of a wedge-shaped cross section adjacent an inner periphery hereof, bonding agent may sometimes flow irregularly or unequally from the flattened shallow bottom portions so that the amount of flow toward the deep portions of a wedge-shaped cross section may be increased. If this happens, the effect of the grooves of a wedge-shaped cross section to prevent leakage of bonding agent will be deteriorated, and the layers of the bonding agent after they have been hardened may not have a uniform thickness. Therefore, another DRAW disk having a following structure has been developed.

Figure 1:
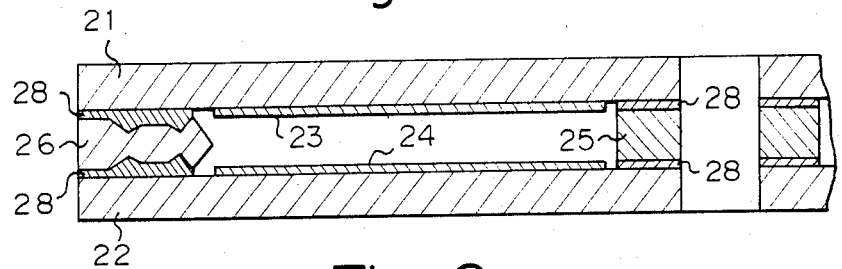
FIG. 1 is a schematic cross sectional view illustrating a DRAW embodiment of the present invention.

In particular, referring to FIG. 1, a DRAW disk shown includes a pair of signal record layers 23, 24 formed on opposing surfaces of a pair of circular base plates 21, 22. The signal record layers 23, 24 are produced using a spin coating method and are formed in a concentrical relationship with the base plates 21, 22 except inner and outer circumferential portions of the circular disks 21, 22 at which inner and outer circumferential annular spacers are to be adhered. The base plates 21, 22 are arranged in an opposing relationship such that the signal record layers 23, 24 thereon may be located inside the disk, and the base plates 21, 22 are carried at inner and outer circumferential portions thereof by means of a pair of annular spacers 25, 26, respectively. Each of the circular base plates 21, 22 and the annular spacers 25, 26 are secured to each other by means of a bonding agent 28.

Figure 2:
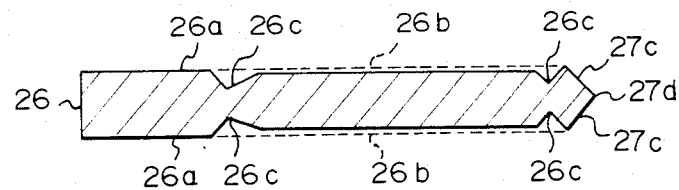
FIG. 2 is an enlarged cross sectional view of an outer circumferential spacer of the DRAW disk according to the present invention.

Referring to FIG. 2, the outer circumferential annular spacer 26 has a pair of annular grooves formed on carrying faces 26a thereof on which the base plates 21, 22 are carried. Each of the annular grooves is formed from a shallow portion 26b defining a flattened shallow bottom, and a pair of deep portions 26c of a wedge-shaped cross section each defining an annular deep narrow groove. The deep portions 26c are formed on opposite sides of the shallow portion 26b adjacent inner and outer peripheries of the annular spacer 26. The cross sectional area of one of the deep portions 26c of a wedge-shaped cross section adjacent the outer periphery of the annular spacer 26 is preferably equal to or greater than the other deep portion 26c adjacent the inner periphery of the annular spacer 26 in order to promote inflow of bonding agent. Further, an annular summit portion 27d is formed at a radially inward portion of the annular spacer 26. The annular summit portion 27d is defined by a pair of inclined faces 27c which extend radially inwardly from the carrying faces 26a at obtuse angles relative to the carrying faces 26a.

In adhering the base plates and the annular spacers to each other, bonding agent is applied to one of the shallow bottom portions 26b of the annular spacer 26 and then the base plate 21 or 22 is placed on the annular spacer 26 in order to adhere the annular spacer 26 to the base plate 21 or 22. Accordingly, the bonding agent is spread out toward the deep portions 26c adjacent the inner and outer peripheries of the annular spacer 26 and thus flows equally from the flattened shallow bottom portion 26b to the deep portions 26c adjacent the inner and outer peripheries of the annular spacer 26. The deep portions of a wedge-shaped cross section catch therein excessive bonding agent which is to be discharged outwardly and inwardly of the disk.

Since layers of the bonding agent can be formed with a sufficient thickness due to the presence of the shallow portions 26b, the bonding agent 28 filled between opposing faces of the base plates 21, 22 and the annular spacer 26 can exhibit its visco-elasticity effectively. Further, due to the presence of the inclined faces 27c of the annular summit portion 27d, bonding agent discharged from the annular grooves is prevented from approaching the signal record layers 23, 24. This is enabled by a surface tension of discharged bonding agent which retains the discharged bonding agent between surfaces of the inclined faces 27c of the annular summit portion 27d and the base plates 21, 22 arranged at an acute angle relative to each other when there is an excessive amount of bonding agent to be filled between the base plates 21, 22 and the annular grooves 26b of the annular disk 26 and such excessive bonding agent is discharged radially inwardly of the disk. In the embodiment shown in FIG. 2, the carrying faces 26a and the pair of inclined faces 26c of the annular spacer 26 are arranged at such an obtuse angle that the acute angle between the surfaces of the inclined faces 27c of the annular summit portion 27d and the base plates 21, 22 may be equal to 45 degrees.

It is to be noted that while in the embodiments described above only the outer circumferential annular spacer is described as having such a specific profile, the inner circumferential annular spacer may also be formed in a similar profile. It is a matter of course that similar effects can be anticipated also in this case.

Figure 3:
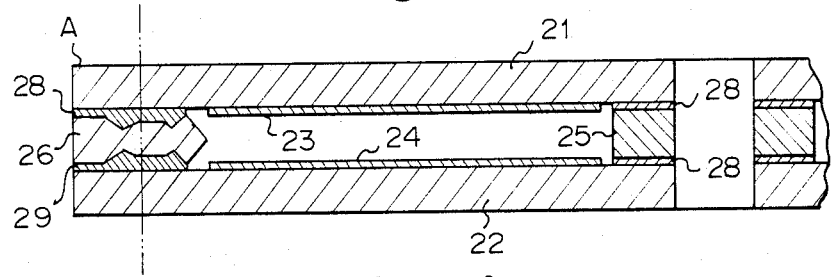
FIG. 3 is a schematic cross sectional view illustrating a step of shaping outer periphery of a DRAW disk according to the present invention.

Further, an outer peripheral portion A of an optical disk thus obtained can be concentrically cut off from the optical disk in order to regulate the profile of the optical disk, as shown in FIG. 3. This enables an actual use of an outer circumferential annular spacer which is not so high in accuracy in dimension of the outer periphery of the profile.

As described in detail above, an optical information record disk according to the present invention is constituted such that each of annular grooves of an annular spacer has a pair of inner and outer circumferential deep portions. Accordingly, a bonding agent for securing the circular disks and the annular spacer to each other in an adhering step will be spread over a flattened groove portion of the annular groove, and after hardening of the bonding agent, a layer of the bonding agent will lie firmly between each opposing faces of the circular base plates and the annular spacer. Consequently, the distance between each such opposing faces and hence the thickness of the layers of the bonding agent can be assured. Accordingly, the bonding agent filled between the opposing faces can exhibit its visco-elasticity effectively, and the adhered portions will not readily be exfoliated by an impact force.

Further, even if an excessive amount of bonding agent is applied in a process of production of an optical information record disk, the bonding agent leaked to a spacing within the disk can be prevented from contacting with a signal record layer.

What is claimed is:

1. In an optical information record disk which includes a pair of circular base plates, at least one of which has a signal record layer thereon, a pair of annular spacers for carrying thereof outer and inner circumferential portions of said circular base plates in an opposing parallel relationship such that said signal record layer or layers may be located inside said record disk, and layers of bonding agent for securing said circular base plates and said annular spacers to each other, the improvement wherein at least one of said annular spacers has an annular groove formed on each carrying face thereof on which said circular baseplates are carried, said annular groove including a basin portion having a flattened bottom and a deep portion which is deeper than said basin portion and located at an inner circumference thereof.

2. An optical information record disk according to claim 1, wherein said annular spacer has an annular summit portion extending in the radial direction of said circular disks and defined by a pair of inclined faces which extend radially inwardly from said carrying faces at obtuse angles relative to said carrying faces.

3. An optical information record disk according to claim 1, wherein said annular groove includes a further deeper portion than said base portion, which is located at an outer circumference.

4. An optical information record disk according to claim 2, wherein said annular groove includes a further deeper portion than said basin portion which is located at an outer circumference.

* * * * *